United States Patent
Noda

(10) Patent No.: US 6,622,850 B2
(45) Date of Patent: Sep. 23, 2003

(54) METHOD FOR CHANGING FINGERS IN PREPARATORY WORK CONDUCTED EXTERNALLY OF A TRANSFER FEEDER, AND DEVICE THEREFOR

(75) Inventor: Shigekazu Noda, Kanazawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/053,957

(22) Filed: Jan. 24, 2002

(65) Prior Publication Data

US 2002/0100665 A1 Aug. 1, 2002

(30) Foreign Application Priority Data

Jan. 26, 2001 (JP) ........................................ 2001-018592

(51) Int. Cl.[7] .............................................. B65G 25/00
(52) U.S. Cl. .................................. 198/621.1; 72/405.16
(58) Field of Search ........................... 198/621.1–621.4; 72/405.01, 405.05, 405.11, 405.13, 405.16, 421

(56) References Cited

U.S. PATENT DOCUMENTS 4,503,969 A * 3/1985 Baba ........................ 198/621.1
4,823,587 A * 4/1989 Wolfgang et al. ......... 72/405.13
4,924,692 A * 5/1990 Rieger et al. ............. 72/405.13
4,932,235 A * 6/1990 Rieger et al. ............. 72/405.13
6,327,888 B1 * 12/2001 Kadlec .................... 72/405.16

FOREIGN PATENT DOCUMENTS

JP          265432      5/1990
JP           34324      1/1991

* cited by examiner

Primary Examiner—Joseph E. Valenza
(74) Attorney, Agent, or Firm—Varndell & Varndell, PLLC

(57) ABSTRACT

With an advancing motion, finger plates together with stationary transfer bars are moved to positions where uprights are not in the way, and finally the finger plates disengaged from the stationary transfer bars are held by plate holding members to be discharged to an area where preparatory work is conducted externally of a transfer feeder, together with movable transfer bars. Accordingly, inherent motions of the transfer feeder are made use of to shunt the finger plates, and as compared with the case where the finger plates are disengaged from the stationary transfer bars at standstill to shunt, cylinders for movement and guide rails are dispensed with to enable attaining light weight and the transfer feeder is enhanced in operating rate.

7 Claims, 14 Drawing Sheets

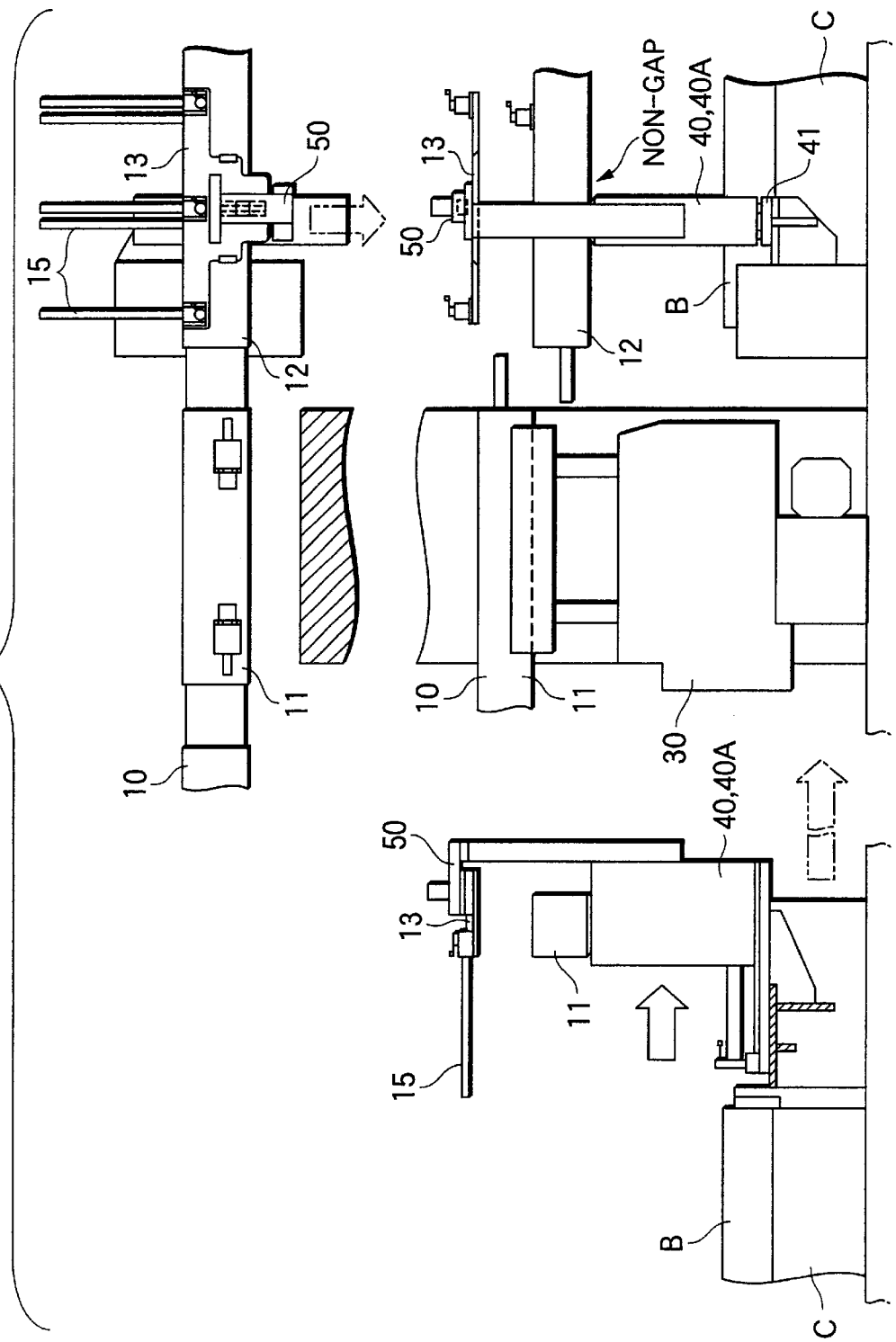

METHOD FOR CHANGING FINGERS IN PREPARATORY WORK CONDUCTED EXTERNALLY OF A TRANSFER FEEDER, AND DEVICE THEREFOR

BACKGROUND OF THE INVENTION

The invention relates to a method for changing fingers in preparatory work conducted externally of a transfer feeder, and a device therefor, and more particularly, to a method for changing fingers, applied to a transfer feeder, in preparatory work conducted externally of the transfer feeder, in which transfer bars adapted to move in a two-dimensional or three-dimensional manner can be individually driven every shaft, and a device therefor.

Generally, installed on a transfer press is a transfer feeder, in which workpieces are successively transferred from one station to the next station by a pair of transfer bars arranged in parallel in a workpiece transfer direction.

Fingers, on which workpieces are placed, are detachably mounted on transfer bars of such transfer feeder, and whenever workpieces transferred are changed, fingers conformed to the fingers are changed in preparatory work conducted externally of the transfer feeder.

Japanese Utility Model Laid-Open Nos. 65432/1990 and 4324/1991 propose devices for changing fingers in preparatory work conducted externally of a transfer feeder.

With the devices described in these publications, transfer bars can be divided into stationary transfer bars and movable transfer bars, and finger holders on the stationary transfer bars to be positioned (positions hidden by uprights) corresponding to the uprights of the transfer press are pulled onto the adjacent movable transfer bars so that the finger holders and the movable transfer bars are transferred out of the transfer press from a workpiece transfer area together with the movable transfer bars.

Such device has an advantage that since the finger holders mounted on the stationary transfer bars disposed in positions hidden by the uprights are transferred outside the transfer press without being disturbed by the uprights, the fingers can be changed in preparatory work conducted externally of the transfer feeder.

Hereupon, since the devices described in the above-mentioned publications are constructed such that the finger holders mounted on the stationary transfer bars are taken out toward the movable transfer bars, air cylinders are necessary for moving the finger holders and besides guide rails or the like must be provided for guiding movements of the holders, by which the transfer bars as a whole are made relatively heavy.

As the transfer bars are increased in weight, they will become liable to flex. Therefore, when the transfer bars are moved at large acceleration, they are subjected to chattering beyond an allowable range, thus causing a problem in generation of a hindrance in transfer of workpieces.

Accordingly, it becomes difficult for the transfer bars to be increased in acceleration, and so it becomes impossible to efficiently actuate the transfer bars in a short cycle time.

Further, with the above-mentioned device, in order to take the finger holders provided on the stationary transfer bars onto the movable transfer bars, it is necessary to avoid interference between the finger holders taken out and the finger holders inherently present on the movable transfer bars.

Hereupon, provided on the stationary transfer bars are air cylinders or the like for turning the finger holders provided on the bars so that the finger holders turned are moved onto the movable transfer bars, whereby interference between the finger holders on the stationary transfer bars and the finger holders on the movable transfer bars is avoided.

Accordingly, air cylinders for turning, in addition to air cylinders for movement and guide rails, increases the transfer bars in weight to further degrade the operating rate of the transfer feeder.

BRIEF SUMMARY OF THE INVENTION

It is an object of the invention to provide a method for changing fingers, for use in a transfer feeder, in preparatory work conducted externally of the transfer feeder, by which method a constitution required for preparatory work conducted externally of the transfer feeder, at the time of finger exchange can be made simple and lightweight and the transfer feeder can be enhanced in operating rate, and a device therefor.

In a first aspect for attaining the above-mentioned object, the invention provides a method for changing fingers in preparatory work conducted externally of a transfer feeder, the fingers being used for the transfer feeder, in which the fingers placing thereon workpieces are detachably mounted on stationary transfer bars and movable transfer bars, respectively, constituting transfer bars, the transfer bars being capable of making at least advancing and returning motions, and connection of the stationary transfer bars and movable transfer bars can be released, the method comprising the steps of: with advancing or returning motion of the transfer bars, moving the transfer bars in a workpiece transfer direction; using a holding means to finger plates for mounting of the fingers, the finger plates being detachably mounted on the stationary transfer bars of the transfer bars, and spacing the holding means and the stationary transfer bars away from each other; with returning or advancing motion of the transfer bars, returning the transfer bars to their original positions in the workpiece transfer direction; using a support means to support the movable transfer bars of the transfer bars; releasing connection of the stationary transfer bars and movable transfer bars; and carrying out the movable transfer bars supported by the support means and the finger plates held by the holding means, together with moving bolsters; the above respective steps being automatically conducted.

In addition, with the method of the invention, it suffices to perform change of fingers in preparatory work conducted externally of a transfer feeder, going through the respective steps, and it is possible to suitably modify the concrete order of the respective steps in practice.

In accordance with the method of the invention, the finger plates mounted on the stationary transfer bars and for mounting of the fingers are moved together with the stationary transfer bars in the workpiece transfer direction.

Since such movement is made in the same advancing or returning motion of the transfer bars as that in normal operation, air cylinders for movement, guide rails and the like are dispensed with unlike a conventional constitution, in which only members holding the fingers can be drawn toward the movable transfer bars.

Also, since the transfer bars can be moved as a whole together with the finger plates, no members interfering with the plates during movement of the finger plates are present, and conventional air cylinders for turning movement or the like are dispensed with.

Accordingly, these conventional parts are dispensed with, by which the transfer bars composed of the stationary transfer bars and the movable transfer bars are made lightweight and it is possible to shorten cycle time of the transfer feeder to enhance the operating rate.

Also, with the above-mentioned method, in order to hold the finger plates with the holding means and to space the finger plates and the stationary transfer bars away from each other, it is desired that the following steps be automatically conducted to include lifting or lowering the transfer bars including the stationary transfer bars with the finger plates mounted thereon by means of lifting or lowering motions, which the transfer bars are designed to enable making; using the holding means to hold the finger plates disposed at a predetermined level, by moving the transfer bars toward the holding means in a horizontal direction perpendicular to the workpiece transfer direction, and/or moving the transfer bars toward the finger plates in the horizontal direction; releasing mounting of the finger plates on the stationary transfer bars; and with the lowering or lifting motion, spacing the transfer bars away from the finger plates disposed at the predetermined level.

With this method, when the finger plates are to be spaced away from the stationary transfer bars and the movable transfer bars, the same lifting or lowering motion of the transfer bars as that in normal operation is made use of, so that it is unnecessary to provide any special parts such as air cylinders or the like, thus preventing an increase of the transfer feeder in weight and maintaining the operating rate favorable.

Further, with the above-mentioned method, in order to space the transfer bars away from the finger plates and to support the movable transfer bars of the transfer bars on the support means, it is desired that the following steps be automatically conducted to include: with the lowering motion, spacing the transfer bars away from the finger plates disposed at the predetermined level, and positioning the same with a minute gap above the support means; with the returning or advancing motion, returning the stationary transfer bars and the movable transfer bars to their original positions in the workpiece transfer direction; and with the lowering motion, lowering again the transfer bars by the minute gap and placing and supporting the movable transfer bars of the transfer bars on the support means.

With this method, the stationary transfer bars and the movable transfer bars are temporarily positioned in a state with a minute gap relative to the support means, so that there is no fear that when returned to the original positions, the transfer bars would contact with the support means and so movement at the time of returning is made smooth.

Also, since the movable transfer bars are placed and supported on the support means, the support construction on the side of the support means is made simple.

In a second aspect for attaining the above-mentioned object, the invention provides a device for changing fingers in preparatory work conducted externally of a transfer feeder, the fingers being used for the transfer feeder, in which the fingers placing thereon workpieces are detachably mounted on stationary transfer bars and movable transfer bars, respectively, constituting transfer bars, the transfer bars being capable of making at least advancing and returning motions, and connection of the stationary transfer bars and movable transfer bars can be released, the device comprising: finger plates detachably mounted on the stationary transfer bars for mounting of the fingers; holding means capable of holding the finger plates, having disengaged from the stationary transfer bars, in a state spaced away from the stationary transfer bars and the movable transfer bars; support means capable of supporting the movable transfer bars; carrying-out means for carrying out the movable transfer bars supported by the support means and the finger plates held by the holding means, together with the moving bolsters; and control means for automatically controlling motions of at least the stationary transfer bars and the movable transfer bars.

With this configuration, the same advancing or returning motions of the transfer feeder itself as that inherently conducted by the transfer feeder during normal operation is made use of to surely draw out the finger plates toward the movable transfer bars, conventionally used parts such as various air cylinders, guide rails or the like are dispensed with to attain making the transfer feeder lightweight, thereby enabling cycle time of the transfer feeder and enhancing the operating rate.

Also, with the above-mentioned configuration, it is desired that the holding means be provided with a clamp means for clamping and holding the finger plates.

With this configuration, the clamp means has the holding means holding the finger plates more firmly, so that falling-off of the finger plates is surely prevented.

Further, with the above-mentioned configuration, it is desired that the support means be designed to be movable horizontally in a direction perpendicular to the workpiece transfer direction, and the holding means be provided integrally with the support means.

With this configuration, the support means is provided to be movable horizontally, whereby at the time of changing the dies on the moving bolsters, the fingers mounted to the movable transfer bars on the support means can be prevented from interfering with the dies.

Also, the holding means is provided integrally with the support means so that the finger plates held by the holding means are also moved concurrently, whereby the fingers mounted on the finger plates can be prevented from interfering with the dies.

Further, the moving mechanism for the support means is made use of to move the holding means toward the finger plates to thereby enable holding the finger plates, whereby there is no need of providing any moving mechanism exclusively used for the holding means, which provides a simplified construction.

BRIEF DESCRIPTION OF THE SEVERAL VIEWS OF THE DRAWINGS

FIG. 14 is a view illustrating motions (STEP 7) of the transfer feeder and of the device for conducting preparatory work externally of the transfer feeder.

DETAILED DESCRIPTION OF THE INVENTION

An embodiment of the invention will be described with reference to the drawings.

Figure 1:
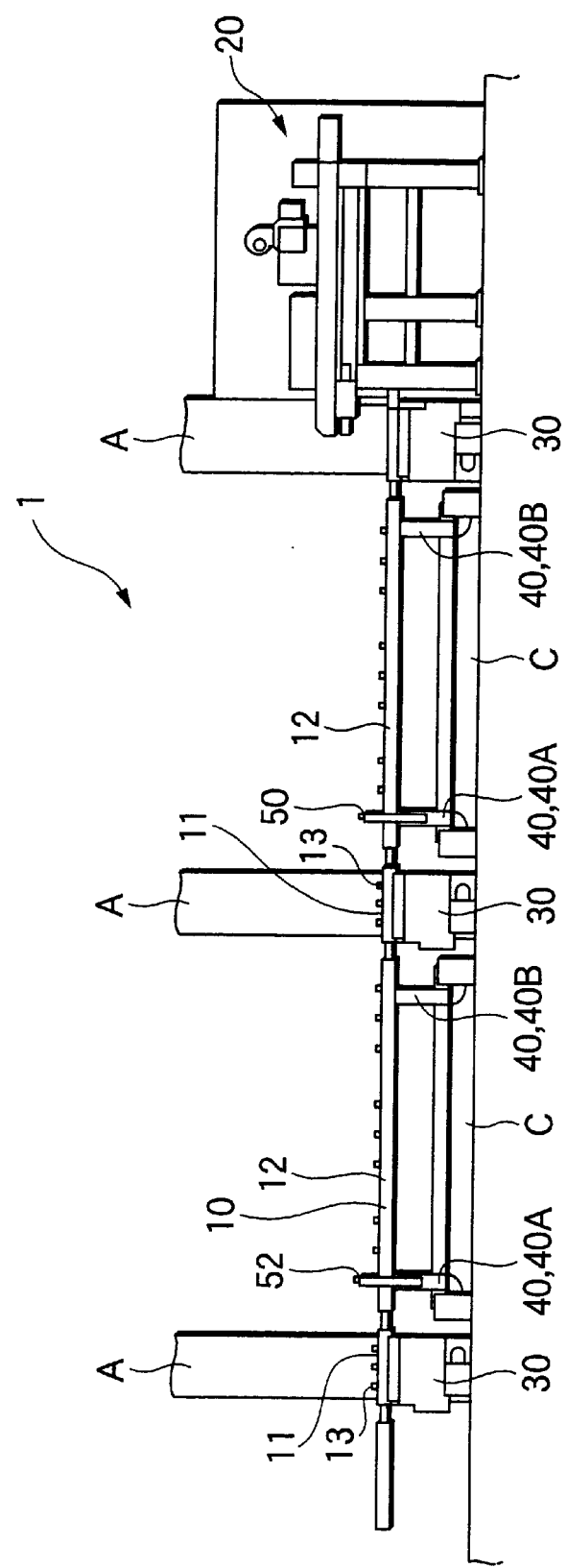
FIG. 1 is a front view schematically showing an entire transfer feeder provided with a device for conducting preparatory work externally of the transfer feeder, according to an embodiment of the invention.
Figure 2:
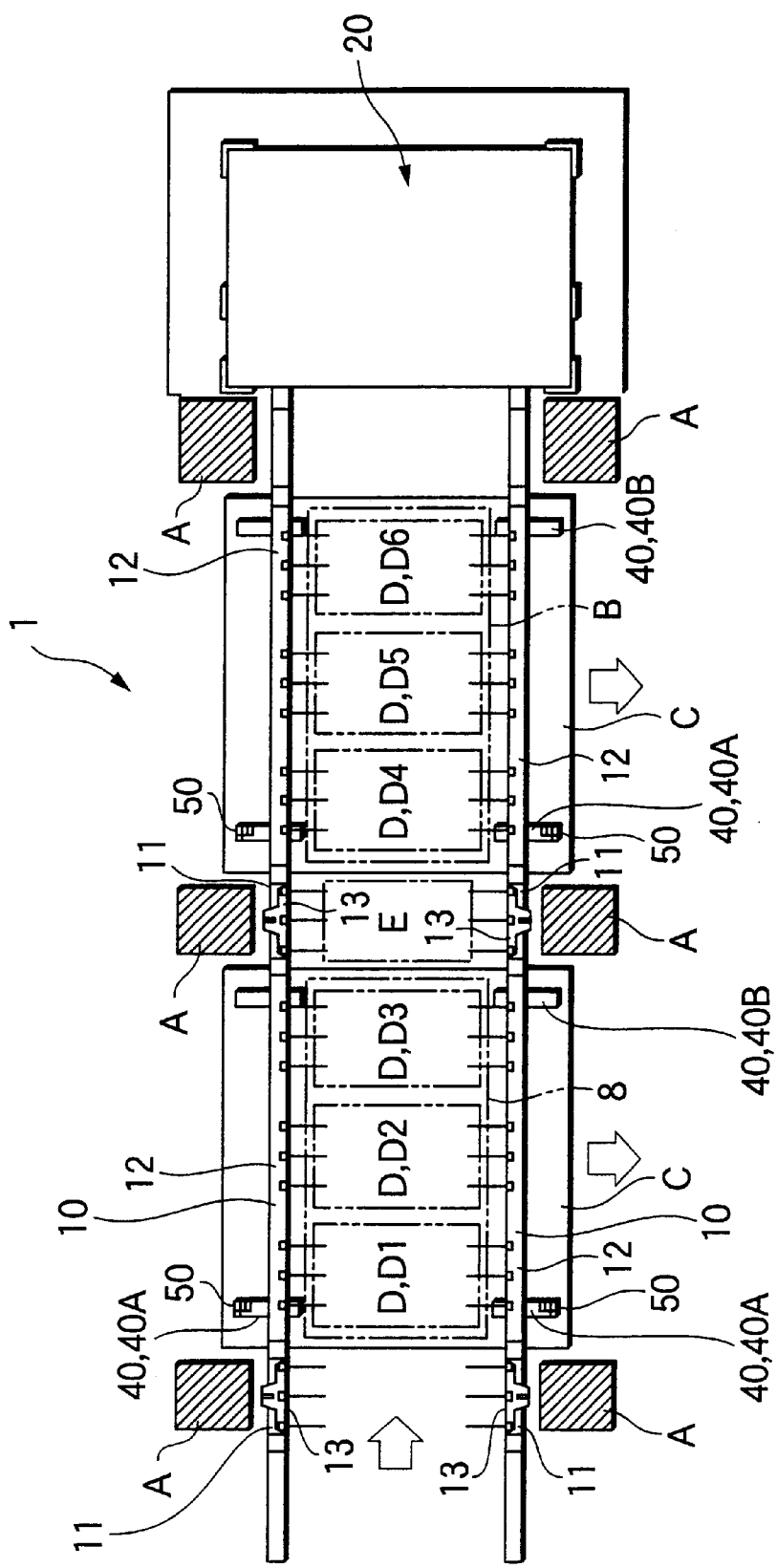
FIG. 2 is a plan view showing the transfer feeder.

FIG. 1 is a front view schematically showing the entire transfer feeder 1 provided with an externally preparatory work device according to the embodiment, FIG. 2 being a plan view showing the feeder.

In FIGS. 1 and 2, the transfer feeder 1 is installed on a transfer press (not shown as a whole) having two slides, and comprises a pair of transfer bars 10 disposed between uprights A corresponding to of the transfer press and in parallel to a workpiece transfer direction, a feed device 20 mounted on a downstream side in the workpiece transfer direction to make advancing and returning motions of the transfer bars 10, clamp lift devices 30 mounted in hidden positions in the uprights A to make clamping, unclamping, lifting and lowering motions of the transfer bars 10, and a control means (not shown) for automatically controlling motions of the feed device 20 and the clamp lift devices 30 in order to operate the transfer feeder 1.

The transfer press is provided with two moving bolsters B, which correspond to the slides, the moving bolsters B being capable of being moved externally of the transfer press from a workpiece transfer region by carriers C, which serve as transfer means. Six dies D1 to D6 in total for three stations are mounted on the respective moving bolsters B, and exchange of the dies on the moving bolsters B is effected by preparatory work conducted externally of the transfer press.

Also, provided in a position corresponding to the central upright A in the transfer press is an idle station E, on which a workpiece is temporarily placed between stations in the dies D3, D4.

The transfer bars 10 comprise stationary transfer bars 11 provided in positions corresponding to the uprights A and substantially hidden by the uprights A, and movable transfer bars 12 provided between the stationary transfer bars 11.

The stationary transfer bars 11 and the movable transfer bars 12 are connected to each other by connection means (not shown), release of such connection means enabling separating the stationary transfer bars 11 from the movable transfer bars 12.

The connection means is composed of suitable hydraulic or pneumatic devices, release of the connection means being effected by controlling the hydraulic or pneumatic devices by means of the above control means.

The stationary transfer bars 11 are normally held by the clamp lift devices 30, as seen from the fact that they are positioned corresponding to the uprights A, and connection of the movable transfer bars 12 to the stationary transfer bars 11 causes the stationary transfer bars 11 to make clamping, unclamping, lifting and lowering motions of the transfer arms 10 as a whole.

Figure 3:
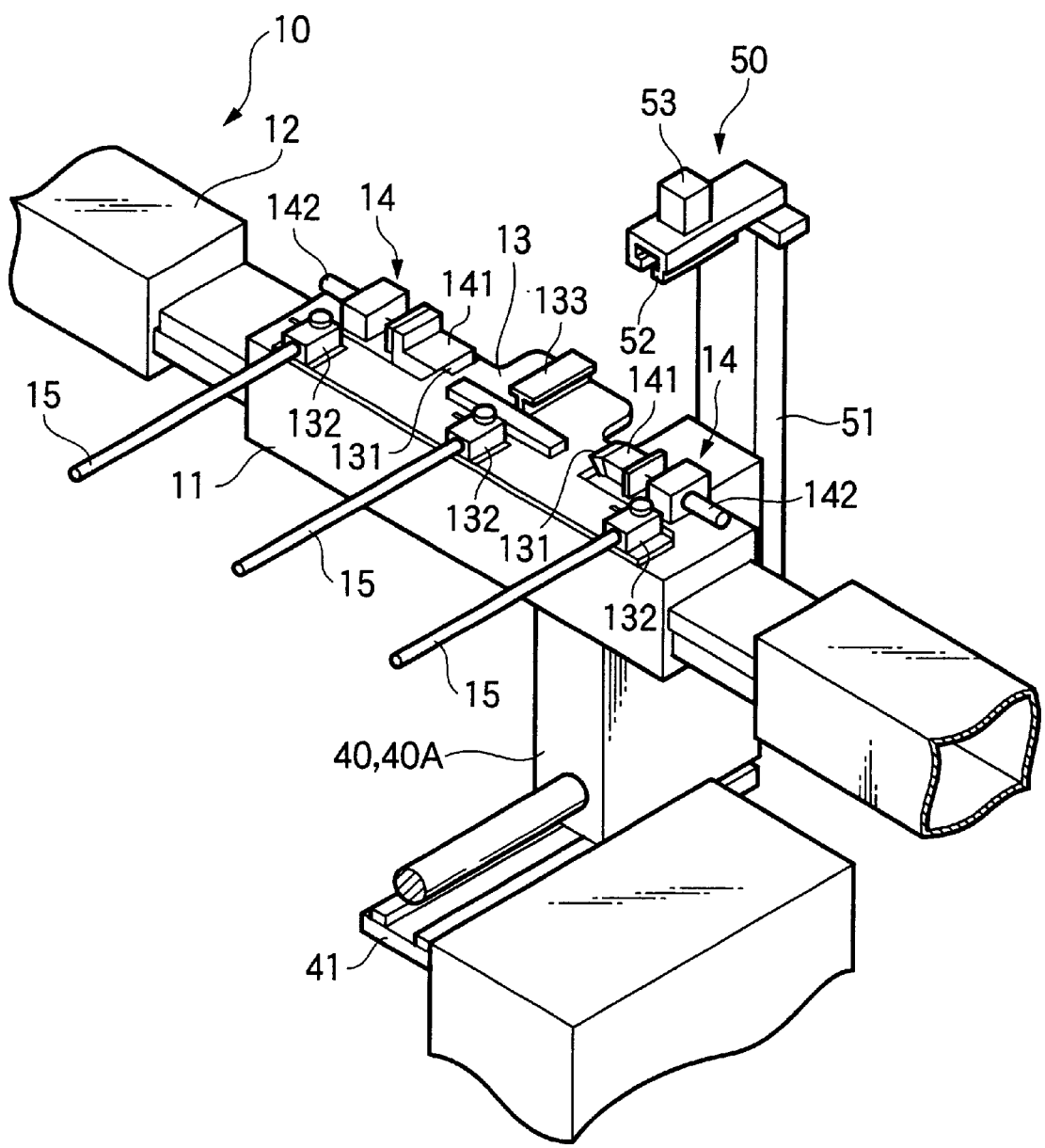
FIG. 3 is a perspective view showing essential parts of the transfer feeder and of the device for conducting preparatory work externally of the transfer feeder.

In addition, FIG. 3 shows a state, in which the feed device 20 causes advancing the transfer bars 10. Thus the stationary transfer bars 11 are fed toward the downstream side in the workpiece transfer direction from the clamp lift devices 30. The clamp lift devices 30 are not shown in FIG. 3.

Figure 4:
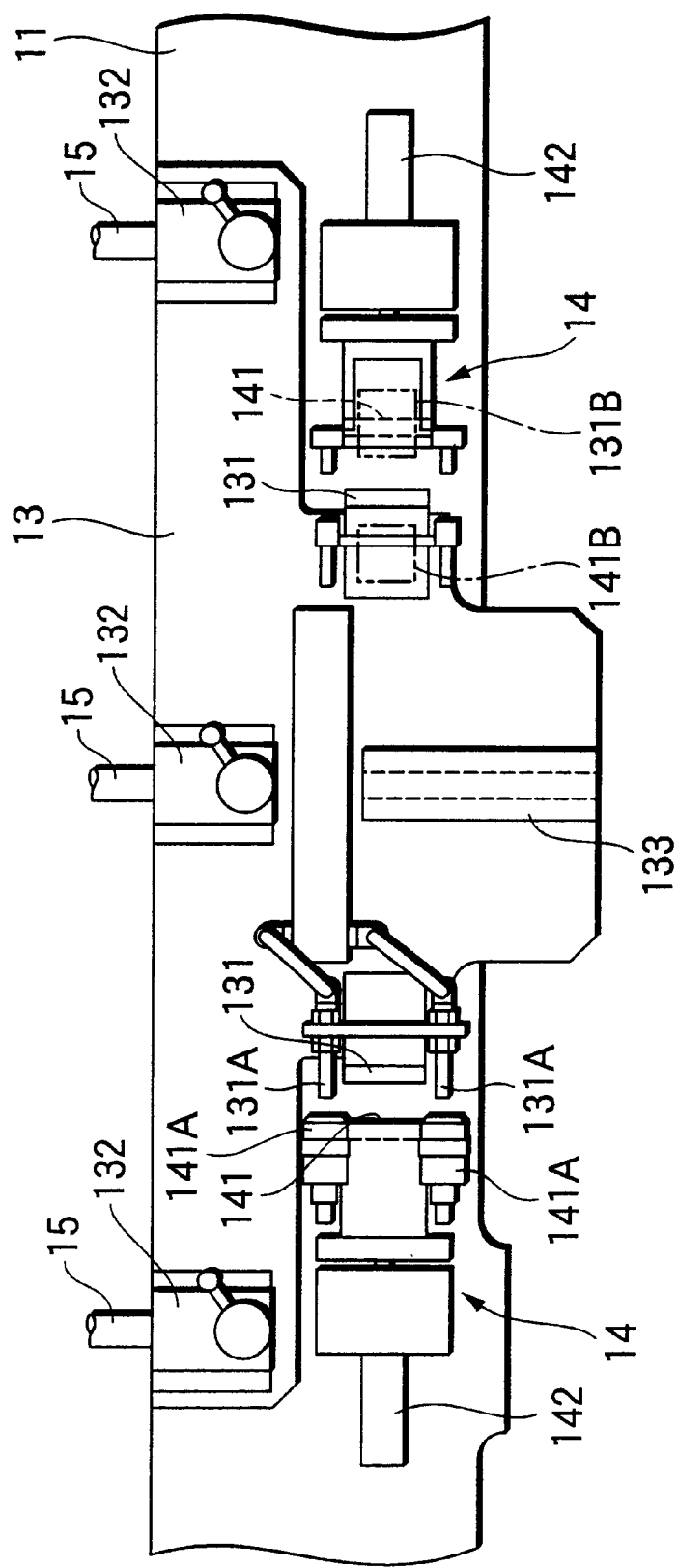
FIG. 4 is a plan view showing the essential parts of FIG. 3.

In FIGS. 3 and 4, a finger plate 13 having a substantially T-shape in plan is provided on an upper surface of the stationary transfer bar 11.

The finger plate 13 is detachably mounted by a pair of mount and dismount means 14 each comprising an engagement piece 141 adapted to engage with an engagement portion 131 and an air cylinder 142. More specifically, the air cylinder 142 is actuated to advance the engagement piece 141 whereby the engagement piece 141 and the engagement portion 131 can be engaged with each other to mount the finger plate 13 to the stationary transfer bar 11, and the engagement piece 141 can be retreated to release engagement of the engagement piece 141 and the engagement portion 131, thus detaching the finger plate 13 from the stationary transfer bar 11.

Provided on sides of the engagement portion 131 and the engagement piece 141 are air couplers 131A, 141A and electric connectors 131B, 141B as shown in FIG. 4 in case of need, connection of these elements being concurrently effected upon engagement of the engagement portion 131 and the engagement piece 141.

Also, provided on the finger plate 13 are three finger holders 132, into each of which a finger 15 is inserted by lever action or the like to be held thereby, the finger 15 projecting inside the workpiece transfer region and being provided to be capable of placing a workpiece thereon. The fingers 15 are inserted into all of the finger holders 132 in the embodiment, but may be held by the finger holders 132 on both ends.

Further, provided centrally of the finger plate 13 is a fitting portion 133 having a T-shaped cross section. The fitting portion 133 is fitted into a plate holding member 50, which is described later and serves as holding means.

Such stationary transfer bars 11 are not provided with a part such as conventional air cylinders for turning motion.

Mean while, the movable transfer bars 12 are provided with only similar finger holders 132 and fingers 15 to those in the stationary transfer bars 11 but not with any member corresponding to the above-mentioned finger plate 13 and any parts such as conventional air cylinders for turning motion, guide rails or the like.

The feed device 20 and the clamp lift devices 30 are designed to be provided with a plurality of servomotors, electric motors and so on, and the control means automatically controls directions and sequences of actions of the respective servomotors and electric motors.

The control means is provided with a CPU, which processes software such as sequence programs or the like, by which sequence programs actions of the feed device 20 and the clamp lift devices 30 are controlled in control mode conformed to the object of work.

With this control means, suitable servomotors and electric motors in the feed device 20 and the clamp lift devices 30 are controlled in a predetermined mode, whereby it is possible to optionally make advancing, returning, clamping, unclamping, lifting and lowering motions of the transfer bars 10.

Control modes in the control means include, in addition to a mode in normal operation, in which the feed device 20 and the clamp lift devices 30 are controlled in relation to actions of the transfer press, various modes for work except the normal operation.

In the mode in normal operation, workpieces for the respective stations are placed on the respective fingers 15 on the stationary transfer bars 11 and the movable transfer bars 12, and actions of the feed device 20 and the clamp lift devices 30 are controlled so as to successively transfer the workpieces from one station to the next station.

Also, for example, in the case where the fingers 15 are to be exchanged in preparatory work conducted externally of the transfer press upon exchange of the dies, actions of the feed device 20 and the clamp lift devices 30 are controlled in other mode for the preparatory work conducted externally of the transfer press than the mode for normal operation.

Subsequently, an explanation will be given to the configuration of the externally preparatory work device and sequence of actions of the transfer feeder 1 and the externally preparatory work in the mode for externally preparatory work.

Figure 5:
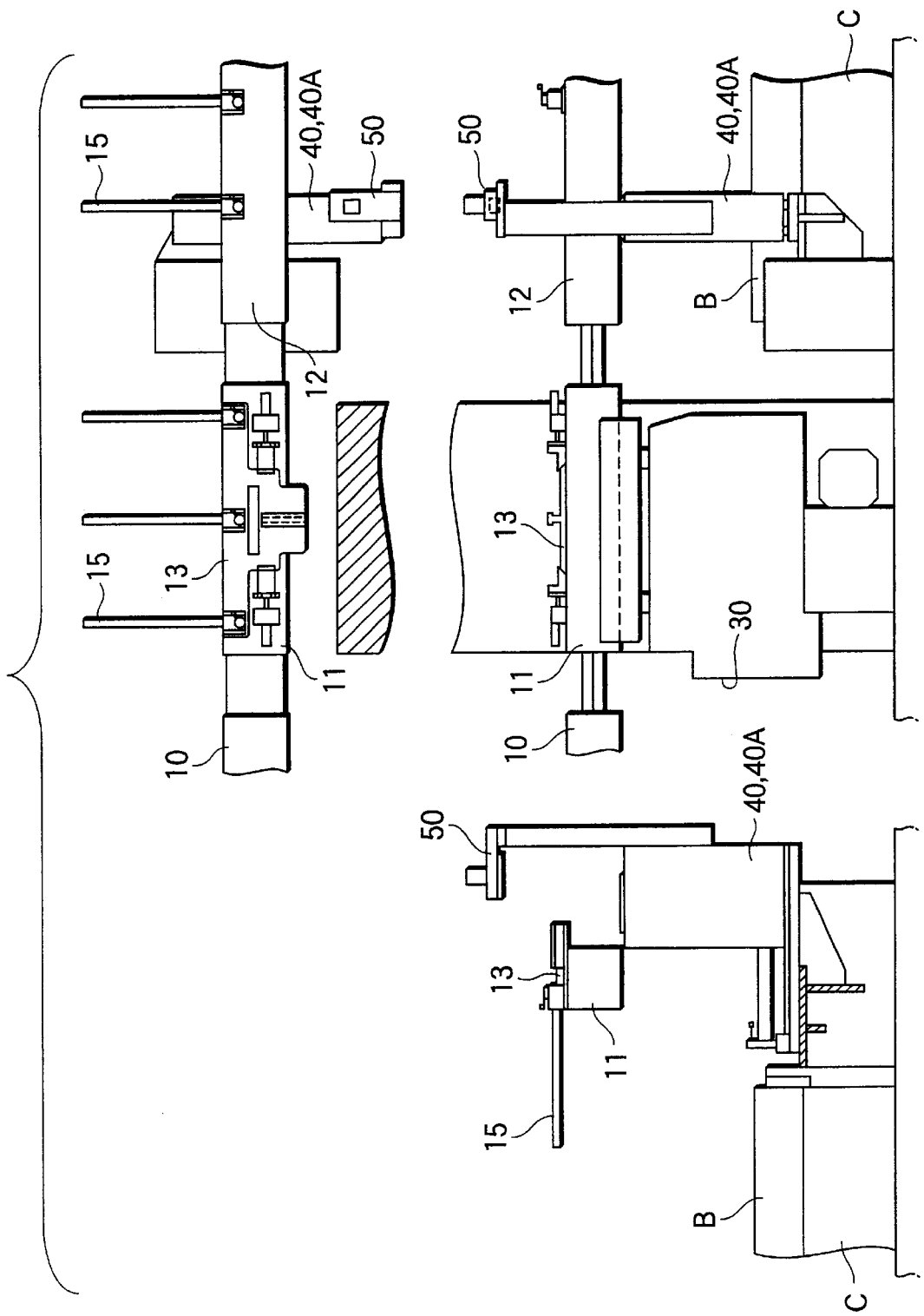
FIG. 5 is a view illustrating motions (STEP 0) of the transfer feeder and of the device for conducting preparatory work externally of the transfer feeder.

Shown in FIG. 1 and trihedral views of FIG. 5 is the transfer feeder 1 placed in a position (cycle stop position, for example, positions where returning, lowering and unclamping motions terminate) prior to the start of normal operation.

In FIGS. 1 and 5, bar bearing bases 40 integral with the carriers C for the moving bolsters B to serve as support means are provided in positions corresponding to both ends of the movable transfer bars 12.

The bar bearing bases 40 can be moved on guide rails 41, which are provided below the bases 40, by means of air cylinders to advance to positions below the movable transfer bars 12 to place the bars 12 thereon. This action is also controlled by the control means.

The bar bearing bases 40 are inherently provided in order to separate the movable transfer bars 12 from the dies D on the moving bolsters B, and so function to prevent interference of the dies D with the fingers 15 on the movable transfer bars 12 when the dies D are lifted or suspended in areas for preparatory work conducted externally of the transfer press.

Plates 51 mount thereon, as shown in FIG. 3, the plate holding members 50 above those bar bearing bases 40A among the respective bar bearing bases 40, which are disposed upstream of the movable transfer bars 12.

The plate holding member 50 comprises an insertion portion 52 having a fitting groove of a T-shaped cross section, and a clamp means 53 provided on the insertion portion 52, and is capable of holding the finger plate 13 on the stationary transfer bar 11 on the upstream side. The clamp means 53 will be described later.

In the embodiment, the externally preparatory work device according to the invention is configured to include the finger plate 13, bar bearing base 40, plate holding member 50, carrier C and the control means.

Subsequently, an explanation will be given to actions at the time of exchange of the fingers 15 accompanied by exchange of the dies D.

STEP 0: In a state of being in a position shown in FIG. 5, the control means is switched over to the mode for externally preparatory work.

Figure 6:
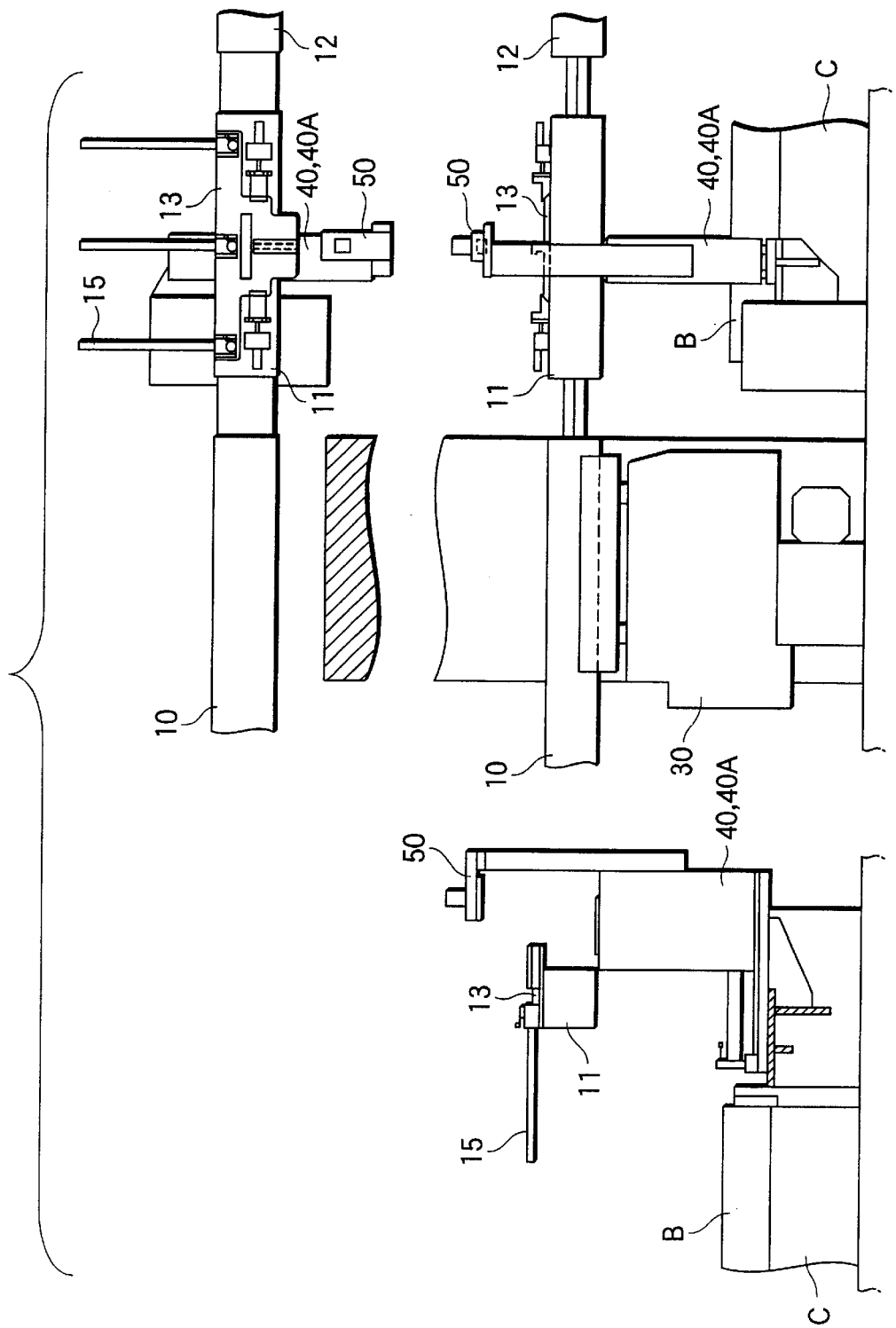
FIG. 6 is a view illustrating motions (STEP 1) of the transfer feeder and of the device for conducting preparatory work externally of the transfer feeder.

STEP 1: Then the transfer feeder 1 advances a predetermined extent as shown in FIG. 6. As a result, the stationary transfer bars 11 move downstream from positions hidden by the uprights A as shown in FIG. 3, so that the fitting portions 133 on the finger plates 13 positionally correspond to the insertion portions 52 in the plate holding members 50 in the workpiece transfer direction.

Figure 7:
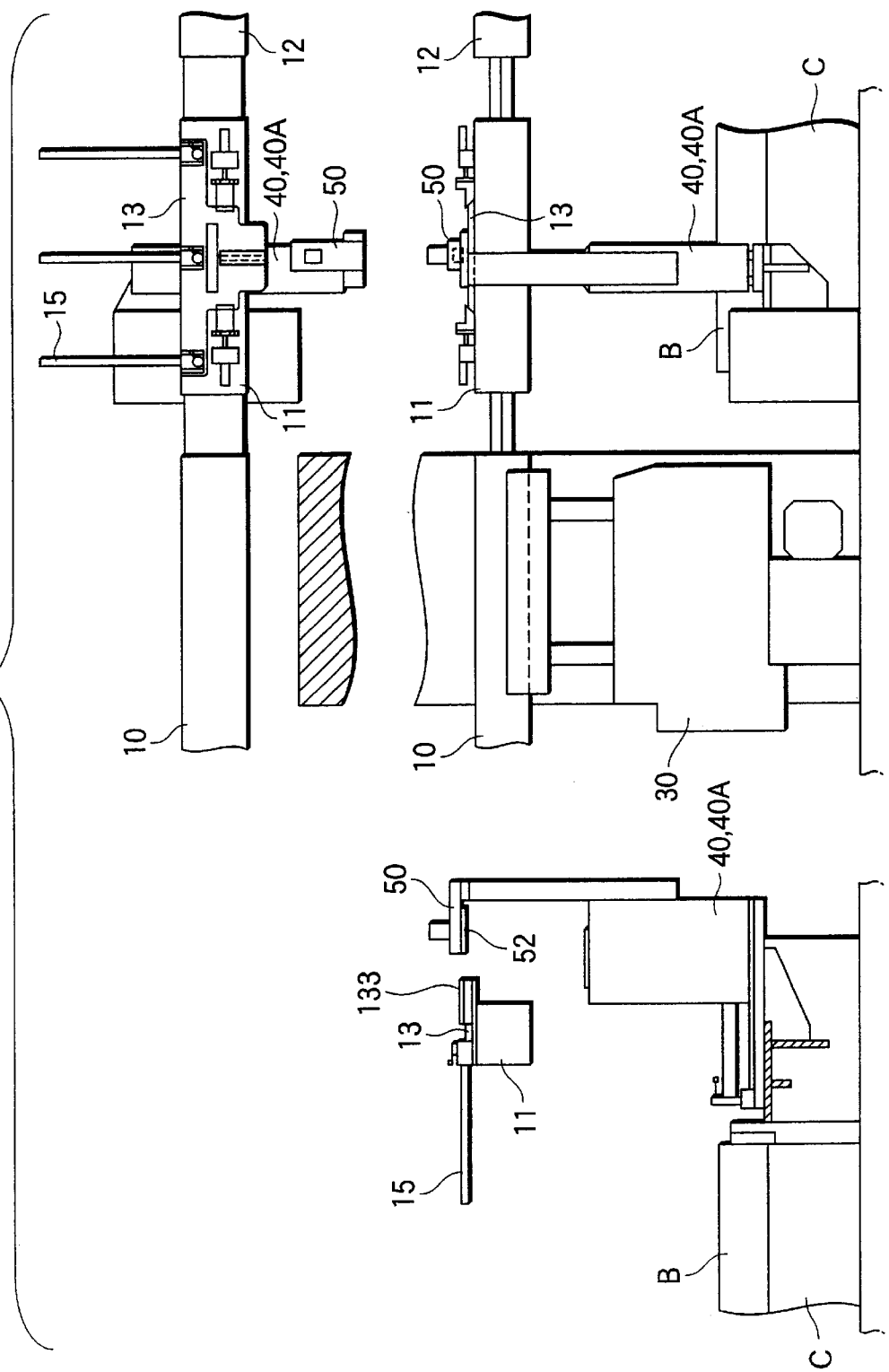
FIG. 7 is a view illustrating motions (STEP 2) of the transfer feeder and of the device for conducting preparatory work externally of the transfer feeder.

STEP 2: Subsequently, the transfer bars 10 make lifting motion of predetermined amount as shown in FIG. 7. As a result, the fitting portions 133 on the finger plates 13 correspond at level to the insertion portions 52 in the plate holding members 50.

Figure 8:
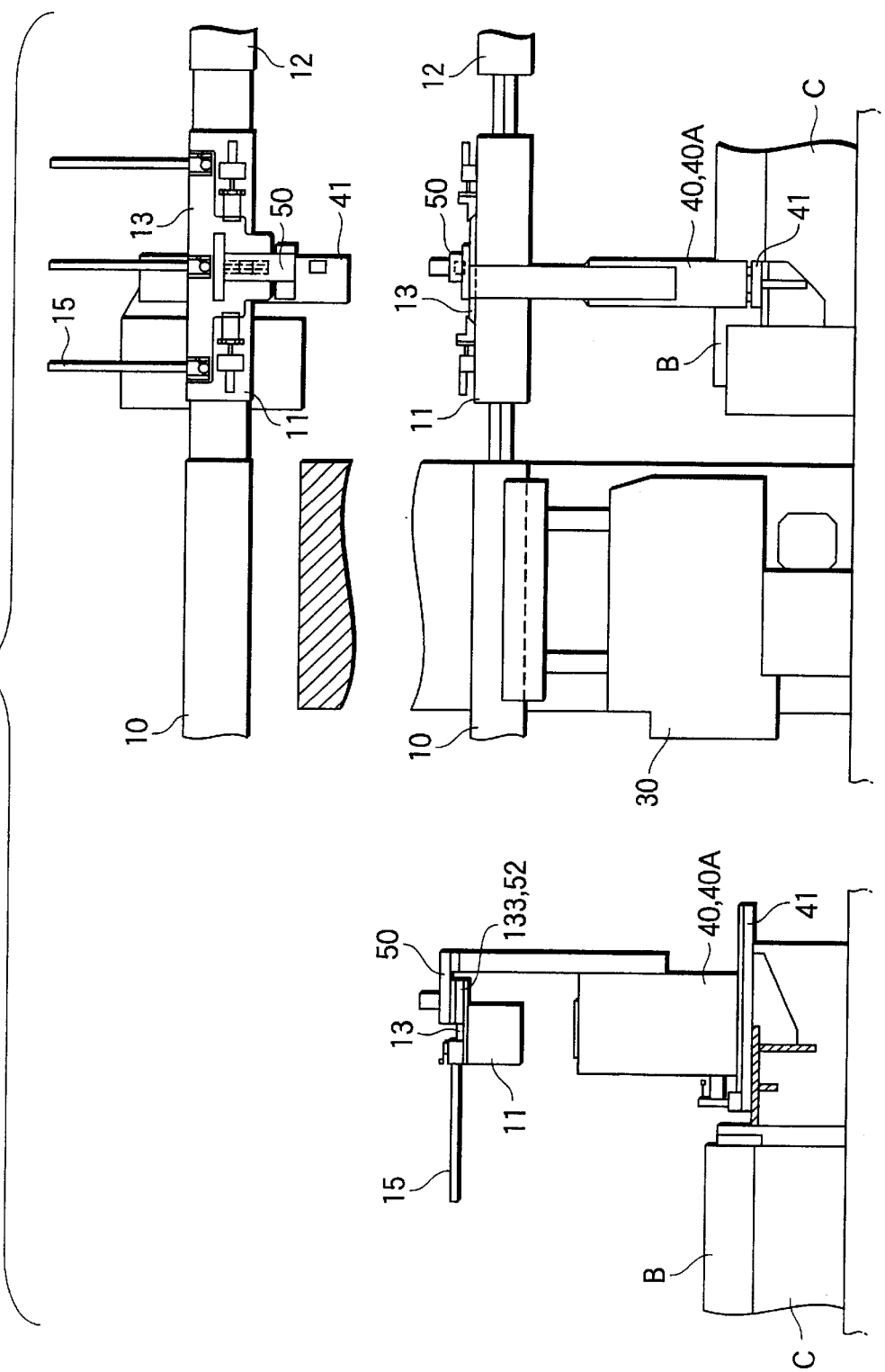
FIG. 8 is a view illustrating motions (STEP 3) of the transfer feeder and of the device for conducting preparatory work externally of the transfer feeder.

STEP 3: Thereafter, the bar bearing bases 40 move toward the transfer bars 10, so that the fitting portions 133 on the finger plates 13 fit into the insertion portions 52 in the plate holding members 50 as shown in FIG. 8.

Figure 9:
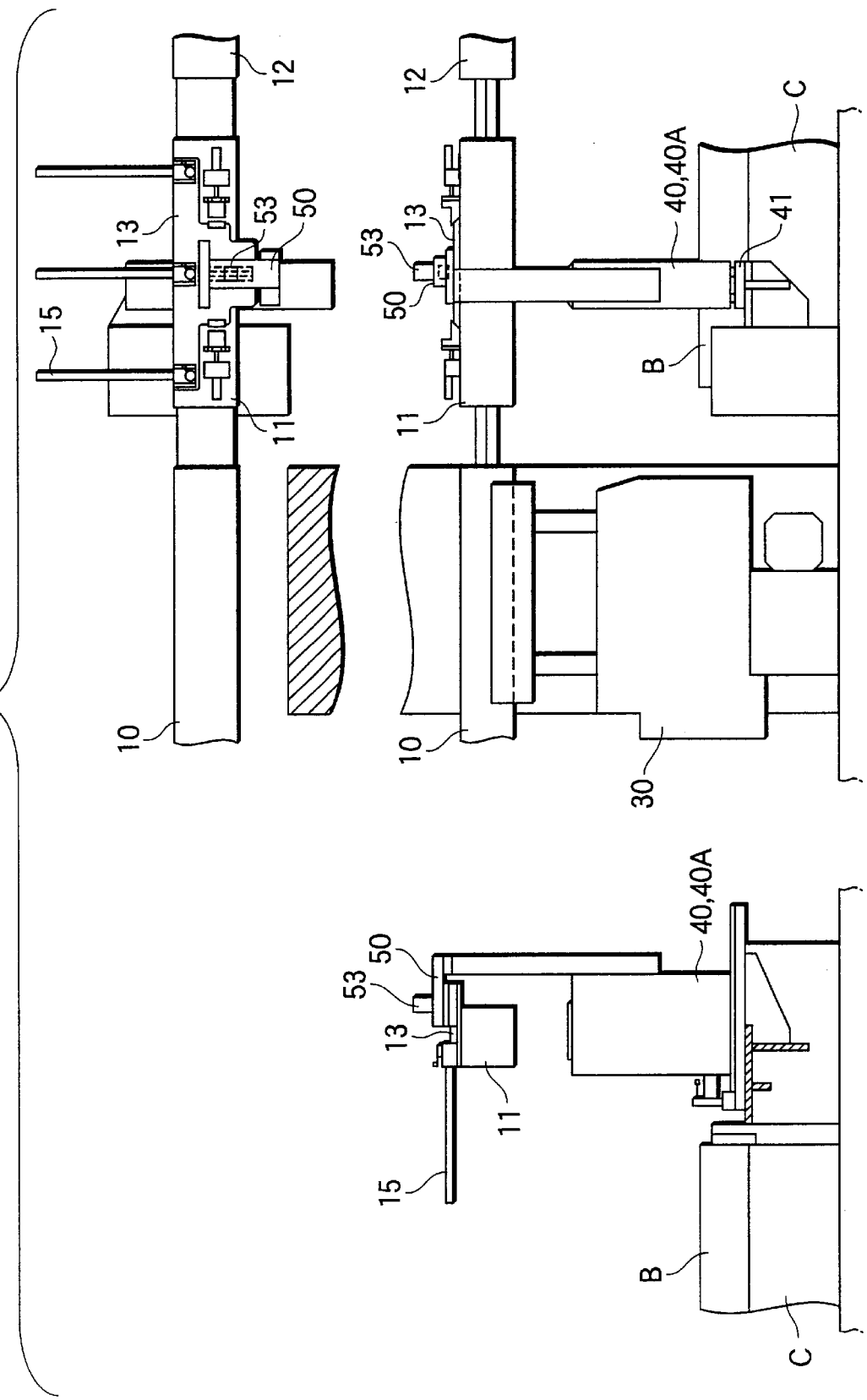
FIG. 9 is a view illustrating motions (STEP 4) of the transfer feeder and of the device for conducting preparatory work externally of the transfer feeder.
Figure 10:
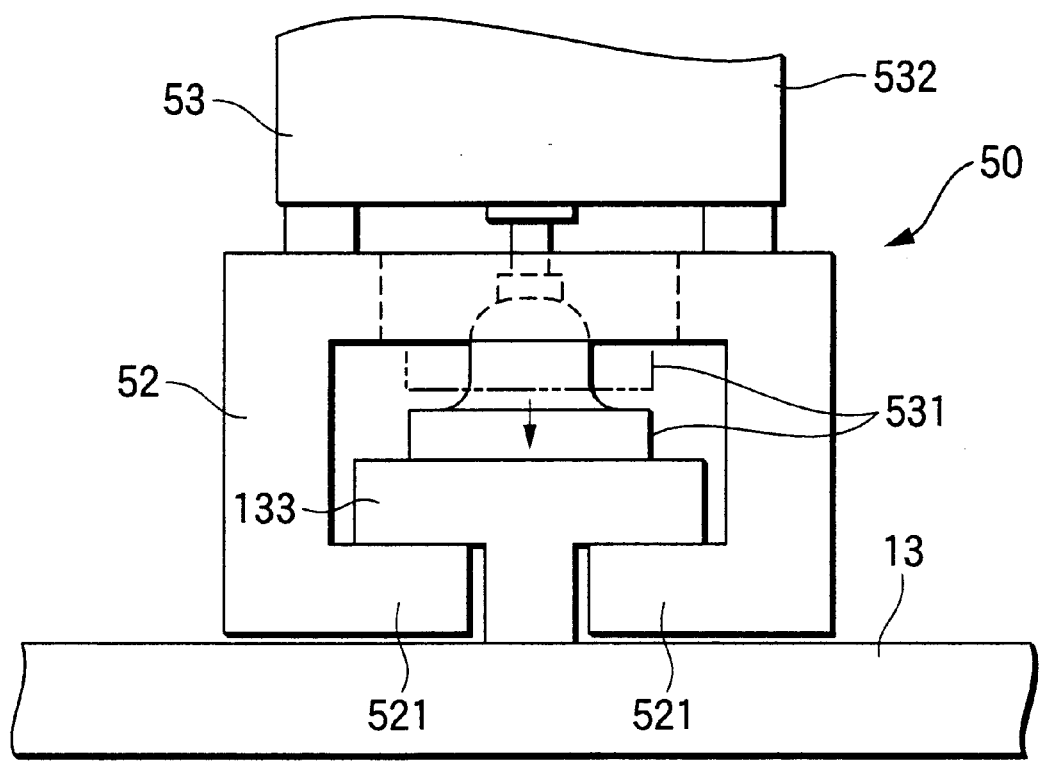
FIG. 10 is a front view showing another essential part of the device for conducting preparatory work externally of the transfer feeder.

STEP 4: Then the air cylinders 142 of the mount and dismount means 14 (FIGS. 3 and 4) provided on the stationary transfer bars 11 are actuated to cause the engagement pieces 141 to get back as shown in FIG. 9, so that the engagement pieces 141 are disengaged from the engagement portions 131 of the finger plates 13.

Then the finger plates 13 are clamped by the clamp means 53 on the plate holding members 50.

The clamp means 53 comprises an abutting member 531 adapted to abut against a top of the fitting portion 133 on the finger plate 13, and an air cylinder 532 for advancing and withdrawing the abutting member 531 relative to the fitting portion 133, and the fitting portion 133 is clamped so as to eliminate play between an upper surface of a lip portion 521 of the insertion portion 52 and the abutting member 531.

Figure 11:
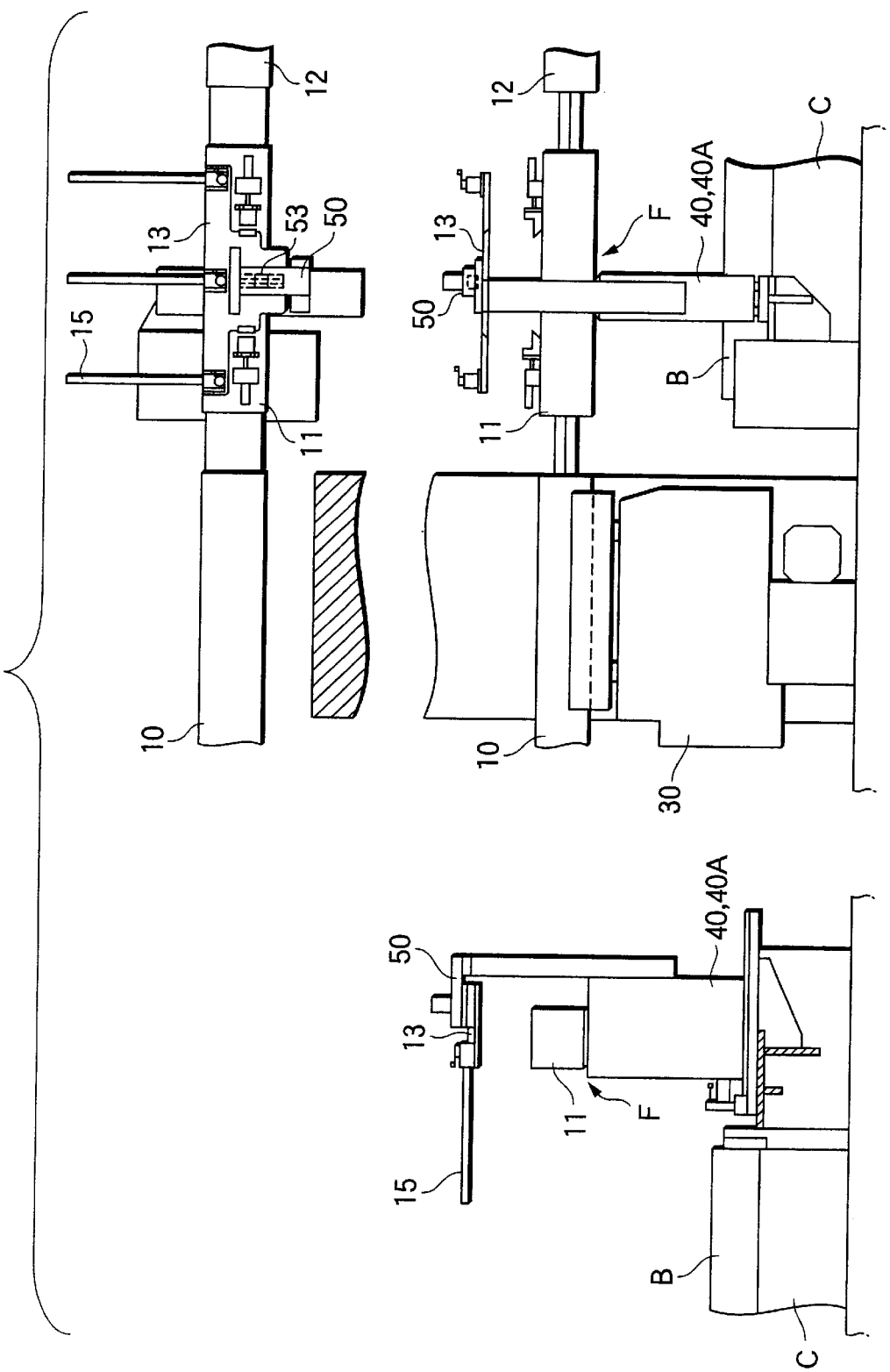
FIG. 11 is a view illustrating motions (STEP 5) of the transfer feeder and of the device for conducting preparatory work externally of the transfer feeder.

STEP 11: After the clamping action, the transfer bars 10 move downward as shown in FIG. 11. An extent of such lowering movement is smaller than that of lifting movement in STEP 2. Therefore, the stationary transfer bars 11 of the transfer bars 10 will be positioned with a minute gap F (approximately 5 mm in the embodiment) above the bar bearing bases 40. Also, as a result of the lowering movement, only the finger plates 13 are held by the plate holding members 50, and the finger plates 13 are vertically spaced away from the stationary transfer bars 11.

Figure 12:
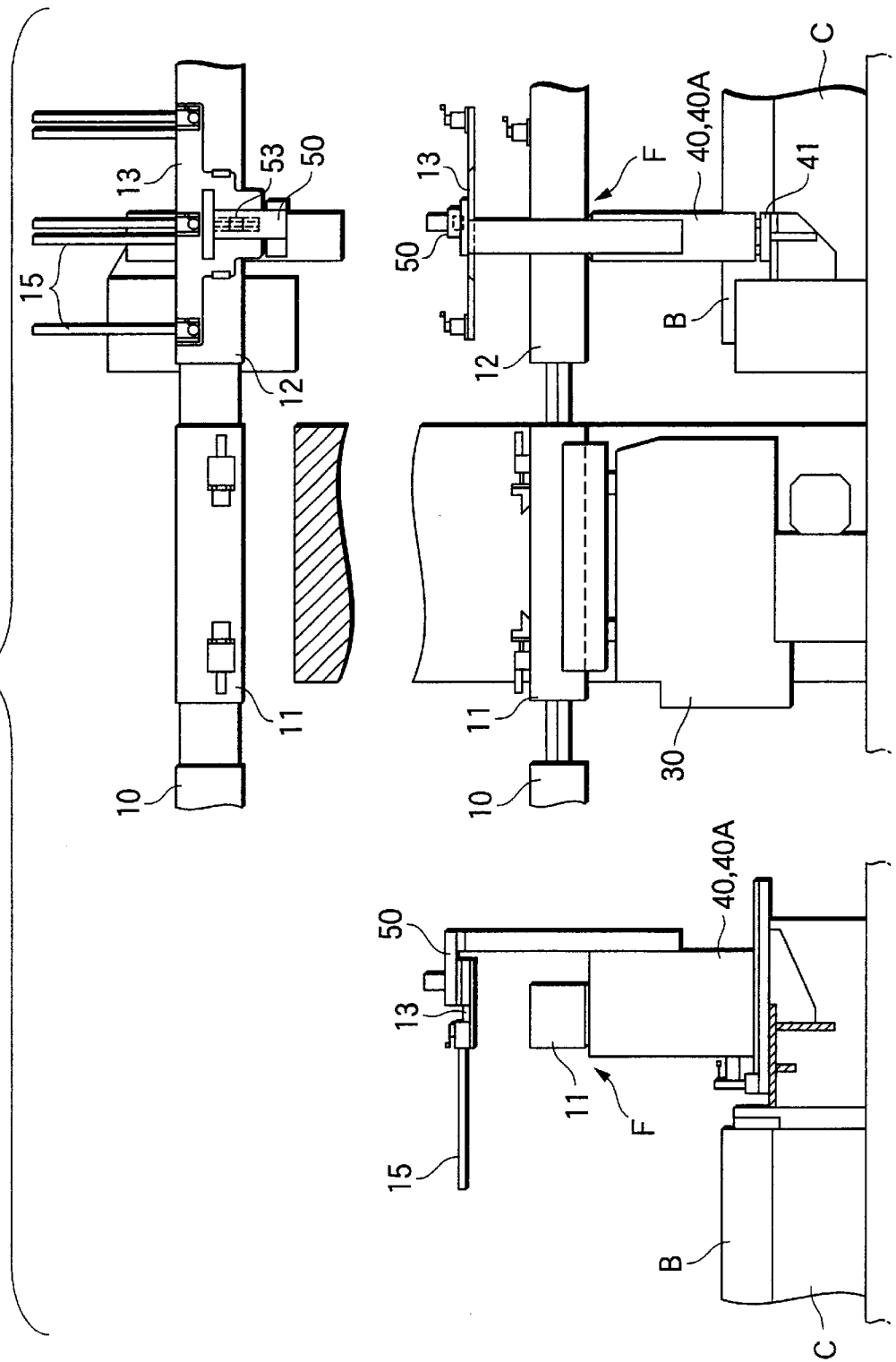
FIG. 12 is a view illustrating motions (STEP 6) of the transfer feeder and of the device for conducting preparatory work externally of the transfer feeder.
Figure 13:
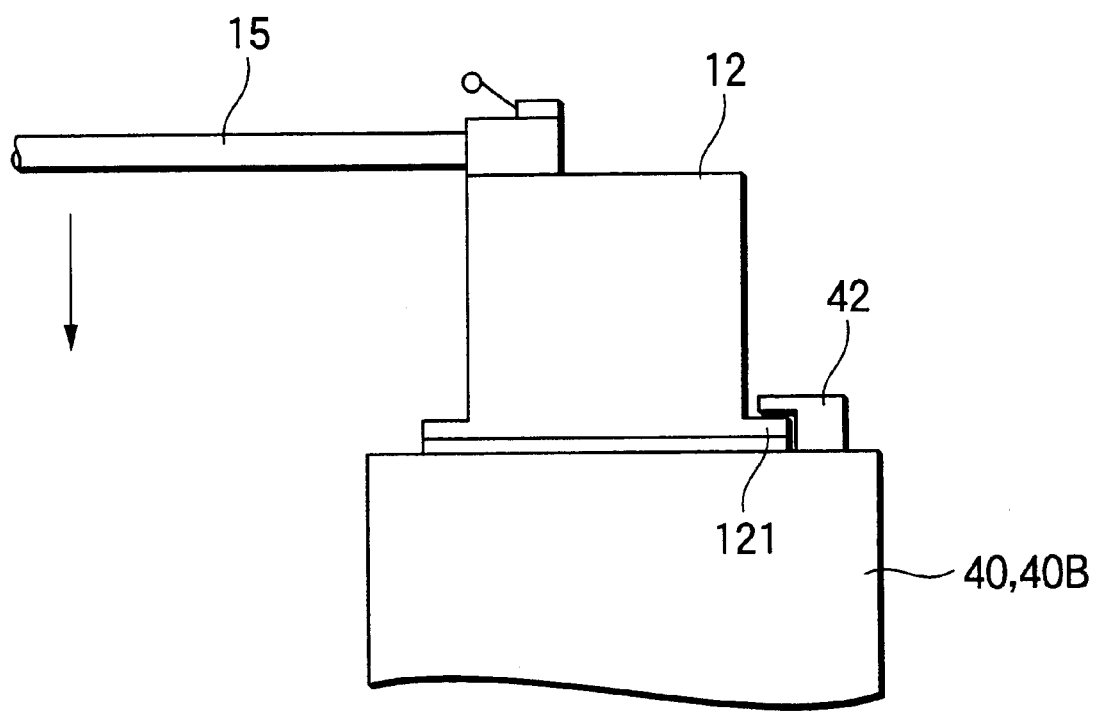
FIG. 13 is a front view showing another essential part of the device for conducting preparatory work externally of the transfer feeder.

STEP 6: Further, the transfer bars 10 makes returning motion to be returned to positions as shown in FIG. 12 before the start of the operation. Thereafter, although omitted from showing, the transfer bars 10 move downward by a minute gap F to place and support the movable transfer bars 12 on upper surfaces of the bar bearing bases 40 and to cause the clamp lift devices 30 to support the stationary transfer bars 11.

At this time, in particular, on sides of the bar bearing bases 40, fall preventing pieces 42 provided on the upper surfaces of the bar bearing bases 40 are disposed corresponding to projecting portions 121 of the movable transfer bars 12 so that the fall preventing pieces 42 latch the projecting portions 121 to prevent the movable transfer bars 12 from falling in a direction of an arrow in the figure due to the weight of the fingers 15 and so on.

STEP 7: Subsequently, connection of the movable transfer bars 12 and the stationary transfer bars 11 is released as shown in a front view in FIG. 14, so that the stationary transfer bars 11 ascend in lifting motion. Subsequently, as shown in a side view in the figure, the bar bearing bases 40 and the plate holding members 50 move to their original positions, and the movable transfer bars 12 and the finger plates 13 get outside of the workpiece transfer region. Thereafter, as shown by two-dot chain lines, the carriers C are moved to cause the movable transfer bars 12 and the finger plates 13 together with the moving bolsters B to be transferred to a work area for externally preparatory work.

Thereafter, exchange of the dies D and exchange of the fingers 15 for the stationary transfer bars 11 and the movable transfer bars 12 are performed in the area for externally preparatory work.

After such exchange, the movable transfer bars 12 are returned in a reverse action to that described above to be connected to the stationary transfer bars 11, the finger plates 13 are fixed on the stationary transfer bars 11, so that the transfer bars 10 are returned as a whole to positions of the start of operation.

The embodiment presents the following effects:
(1) With the transfer feeder 1, the finger plates 13 mounted on the stationary transfer bars 11 move in the workpiece transfer direction together with the stationary transfer bars 11 at the time of exchange of the fingers 15. Since such movements are performed in the same advancing motion as that of the stationary transfer bars 11 during normal operation
(STEP 1), only the finger plates 13 are prevented from being disengaged from the stationary transfer bars 11 as standstilled and drawn toward the movable transfer bars 12, so that air cylinders for movement, guide rails or the like having been conventionally used can be dispensed with.

Also, since the entire transfer bars 10 move together with the finger plates 13, any members accompanying the finger plates 13 and interfering therewith are not existent, and conventional cylinders for turning can be also dispensed with.

Accordingly, these conventional parts are dispensed with, which can make the transfer bars 10 lightweight, whereby there is generated no chattering causing a trouble in workpiece transfer even when the transfer bars 10 are moved at great acceleration, and the transfer feeder 1 can be shortened in cycle time to surely enhance in operating rate.
(2) In addition, since in separation of the finger plates 13 from the stationary transfer bars 11 of the transfer bars 10, the same lowering motion as that of the transfer feeder 1 during normal operation is made use of (STEP 5), it is unnecessary in this respect to provide any special parts such as air cylinders or the like, thus preventing an increase in weight and so enabling maintaining the operating rate favorable.
(3) Further, at the time of the above-mentioned lowering motion, the transfer bars 10 are temporarily positioned in a state with a minute gap F relative to the bar bearing bases 40, and returned in returning motion to the positions at the start of operation, so that it is possible to prevent the transfer bars 10 from coming into contact with the upper surfaces of the bar bearing bases 40 at the time of such returning motion, thus enabling making the returning motion smooth.
(4) Also, since the movable transfer bars 12 are placed on the bar bearing bases 40 to be supported thereby, the support construction on the bar bearing bases 40 side can be made simple and the movable transfer bars 12 can be supported in a stable manner.
(5) With the transfer feeder 1, the clamp means 53 is provided on the plate holding members 50, and used to enable firmly holding the finger plates 13 on the plate holding members 50, thus making it possible to surely prevent falling-off of the finger plates 13.
(6) Further, the bar bearing bases 40 can move together with the movable transfer bars 12 to separate from centers of the bolsters to space the fingers 15 away from the dies D on the moving bolsters B, whereby it is possible to avoid interference of the dies with the fingers 15 at the time of exchange of the dies D, thus performing exchange of the dies D easily and rapidly.
(7) Also, since the plate holding members 50 are specifically provided integrally on the bar bearing bases 40, the finger plates 13 held by the plate holding members 50 can be concurrently moved away from the centers of the bolsters, the fingers 15 mounted on the finger plates 13 can be prevented from interfering with the dies D.
(8) Further, in holding the finger plates 13 with the use of the plate holding members 50, there is a need of moving the plate holding members 50 toward the finger plates 13. In such movement, the moving mechanisms for the bar bearing bases 40 are made use of, so that there is no need of providing any moving mechanisms exclusively used for the plate holding members 50, thus enabling making the construction simple.
(9) Meanwhile, the fall preventing pieces 42 adapted to latch the projecting portions 121 of the movable transfer bars 12 are provided on the bar bearing bases 40. So, there is no fear that the movable transfer bars 12 placed on the bar bearing bases 40 should fall due to weight of the fingers 15 and the like while the carriers C are moved to transfer the movable transfer bars 12 to the externally preparatory work area, so that it is possible to surely perform transfer.

In addition, the invention is not limited to the above-mentioned embodiment, but includes other constituents capable of attaining the object of the invention, and the following modifications are also covered by the invention.

For example, with the above-mentioned embodiment, the transfer bars 10 make advancing motion to thereby move the finger plates 13 of the stationary transfer bars 11 toward the plate holding members 50. However, in the case where the finger plates 13 are held by the plate holding members 50 on the upstream side, and positions at the completion of advancing motion are set as positions of the start of operation, the transfer bars 10 may make returning motion to move the finger plates 13 into positions below the plate holding members 50.

Also, in the case where positions at the completion of lifting motion are set as positions of the start of operation, the plate holding members 50 may be provided below the transfer bars 10 and lowering movement may cause the finger plates 13 and the plate holding members 50 to be made at the same level, after which lifting motion may be used to space the stationary transfer bars 11 and the plate holding members 50 away from each other.

However, if the plate holding members 50 were provided below the transfer bars 10, the construction below the transfer bars 10 would become complex, which would possibly make it hard to ensure passages for discharge of waste materials or the like. Therefore, the plate holding members 50 are preferably provided above the transfer bars 10 to cause lowering movement to space the stationary transfer bars 11 and the plate holding members 50 away from each other.

Further, in addition to making use of such lifting and lowering motions to space the stationary transfer bars 11 and the plate holding members 50 away from each other, the plate holding members 50 may be designed to be able to move vertically so that the plate holding members 50 with the finger plates 13 held thereby are made to ascend or descend to space the stationary transfer bars and the plate holding members away from each other.

With the above-mentioned embodiment, the plate holding members 50 are provided integrally with the bar bearing bases 40A, which are moved to move the plate holding members 50 toward the finger plates 13. However, the finger plates 13 may be moved toward the plate holding members 50 by making use of unclamping motion of the transfer bars 10.

However, such motion applies in the case where there is an adequate moving space between the transfer bars 10 and the uprights A.

Also, with the transfer feeder according to the invention, the bar bearing bases 40 and the plate holding members 50 are not necessarily provided integral with each other, but the plate holding members 50 may be provided separately.

In such case, however, there is the possibility that a moving mechanism for horizontal motion be needed for the plate holding members 50, which would cause a fear of complexity in construction. Therefore, in the case where the horizontally movable bar bearing bases 40 are inherently provided as in the above-mentioned embodiment, it is desired that the plate holding members 50 be provided integrally on the bar bearing bases 40.

The transfer feeder 1 according to the above-mentioned embodiment is configured such that the transfer bars 10 move in a three-dimensional manner. However, the invention can be also applied to a transfer feeder, in which transfer bars do not make clamping and unclamping motions but move vertically in a two-dimensional manner, or a transfer feeder, in which transfer bars do not make lifting and lowering motions but move horizontally in a two-dimensional manner.

With the transfer feeder 1 according to the above-mentioned embodiment, the feed device 20 and the clamp lift devices 30 are designed to include servomotors and the like, which makes the transfer bars 10 movable in a three-dimensional manner. However, the invention is not limited to such construction but power may be transmitted from other power sources through crank mechanisms to move the transfer bars in a three-dimensional or two-dimensional manner.

In short, with the transfer feeder according to the invention, it suffices that the transfer bars can make advancing, returning, clamping, unclamping, lifting and lowering motions separately. A concrete construction of the transfer feeder may be optionally determined in practice.

What is claimed is:

1. A method for changing fingers in preparatory work conducted externally of a transfer feeder, the fingers being used for the transfer feeder, in which the fingers placing thereon workpieces are detachably mounted on stationary transfer bars and movable transfer bars, respectively, constituting transfer bars, the transfer bars being capable of making at least advancing and returning motions, and connection of the stationary transfer bars and movable transfer bars can be released, the method comprising the steps of:

with advancing or returning motion of the transfer bars, moving the transfer bars in a workpiece transfer direction;

using a holding means to hold finger plates for mounting of the fingers, the finger plates being detachably mounted on the stationary transfer bars of the transfer bars, and spacing the holding means and the stationary transfer bars away from each other;

with returning or advancing motion of the transfer bars, returning the transfer bars to their original positions in the workpiece transfer direction;

using a support means to support the movable transfer bars of the transfer bars;

releasing connection of the stationary transfer bars and movable transfer bars; and carrying out the movable transfer bars supported by the support means and the finger plates held by the holding means, together with moving bolsters;

the above respective steps being automatically conducted.

2. The method according to claim 1, wherein in order to hold the finger plates with the holding means and to space the finger plates and the stationary transfer bars away from each other, the following steps are automatically conducted to include:

lifting or lowering the transfer bars including the stationary transfer bars with the finger plates mounted thereon to a predetermined level by means of lifting or lowering motions, which the transfer bars are designed to enable making;

using the holding means to hold the finger plates disposed at the predetermined level, by moving the transfer bars toward the holding means in a horizontal direction perpendicular to the workpiece transfer direction, and/or moving the holding means toward the finger plates in the horizontal direction;

releasing mounting of the finger plates on the stationary transfer bars; and with the lowering or lifting motion, spacing the transfer bars away from the finger plates disposed at the predetermined level.

3. The method according to claim 2, wherein in order to space the transfer bars away from the finger plates and to support the movable transfer bars of the transfer bars on the support means, the following steps are automatically conducted to include:

with the lowering motion, spacing the transfer bars away from the finger plates disposed at the predetermined level, and positioning the same with a minute gap above the support means;

with the returning or advancing motion, returning the stationary transfer bars and the movable transfer bars to their original positions in the workpiece transfer direction; and with the lowering motion, lowering again the transfer bars by the minute gap and placing and supporting the movable transfer bars of the transfer bars on the support means.

4. A device for changing fingers in preparatory work conducted externally of a transfer feeder, the fingers being used for the transfer feeder, in which the fingers placing thereon workpieces are detachably mounted on stationary transfer bars and movable transfer bars, respectively, constituting transfer bars, the transfer bars being capable of making at least advancing and returning motions, and connection of the stationary transfer bars and movable transfer bars can be released, the device comprising:

finger plates detachably mounted on the stationary transfer bars for mounting of the fingers;

holding means capable of holding the finger plates, being disengaged from the stationary transfer bars, in a state spaced away from the stationary transfer bars and the movable transfer bars;

support means capable of supporting the movable transfer bars;

carrying-out means for carrying out the movable transfer bars supported by the support means and the finger plates held by the holding means, together with the moving bolsters; and control means for automatically controlling motions of at least the stationary transfer bars and the movable transfer bars.

5. The device according to claim 4, wherein the holding means is provided with clamping means, which clamps and holds the finger plates.

6. The device according to claim 4, wherein the support means is constructed to be movable horizontally in a direction perpendicular to the workpiece transfer direction, and is provided with the holding means.

7. The device according to claim 5, wherein the support means is constructed to be movable horizontally in a direction perpendicular to the workpiece transfer direction, and is provided with the holding means.

* * * * *